Nov. 15, 1938.      F. NIESEMANN      2,137,025
FLUID PRESSURE REGULATOR
Filed Feb. 27, 1937
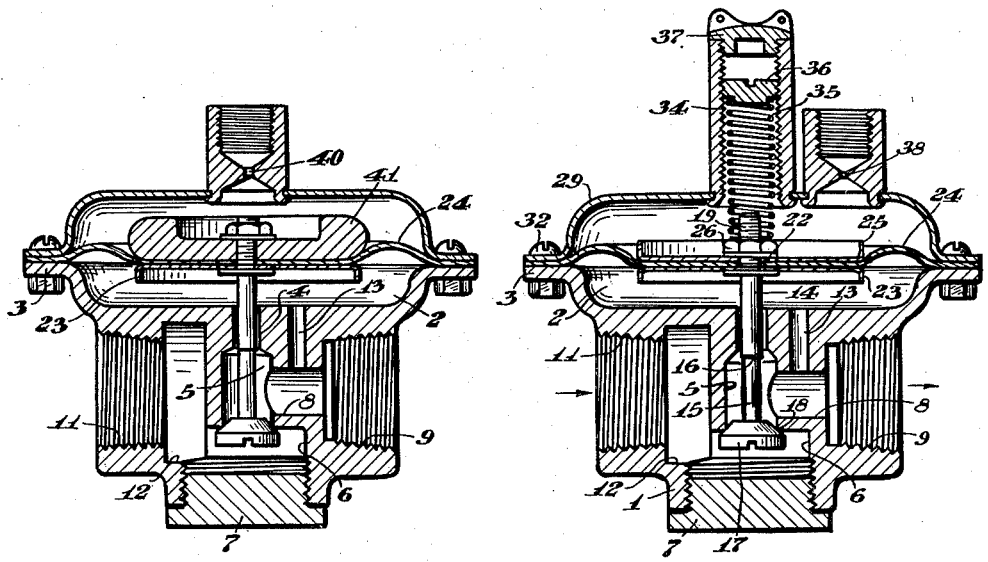
Fig. 2      Fig. 1
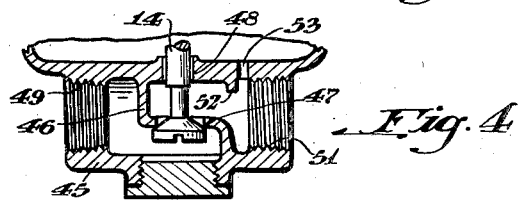
Fig. 4
Fig. 3
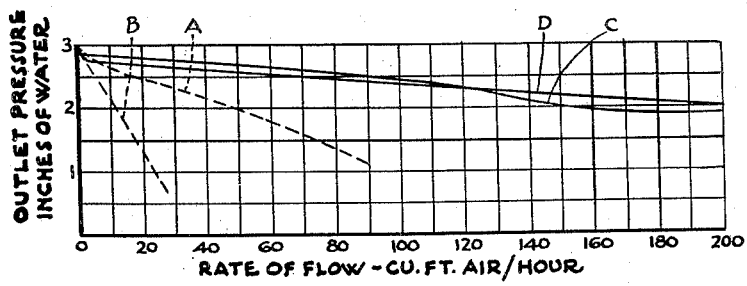
INVENTOR
FRITZ NIESEMANN.
BY
ATTORNEY Patented Nov. 15, 1938

2,137,025

UNITED STATES PATENT OFFICE 2,137,025

FLUID PRESSURE REGULATOR

Fritz Niesemann, Pittsburgh, Pa., assignor to Pittsburgh Equitable Meter Company, Pittsburgh, Pa., a corporation of Pennsylvania Application February 27, 1937, Serial No. 128,192

1 Claim. (Cl. 50—23)

This invention relates to fluid pressure regulators, and particularly to regulators for gas lines.

In domestic gas ranges in common use for cooking and baking, which generally have several grate type burners for general use and an oven burner controlled by a thermostat connected to the main gas supply, a pilot light being provided for igniting the burners, difficulty is usually experienced in keeping the flame of the burners constant due to the variable pressure of the supply line. In distribution systems the pressure in the line generally varies at different times of the day and if the pilot light is set when the supply pressure in the line is low the flame will be too high when the supply pressure returns to normal. Conversely, if the pilot light is adjusted at the time of peak pressure in the line the pilot light may be extinguished due to the drop in pressure in the line at other times of the day. Also, it is essential to maintain the pressure constant so that when the grate burners are operated for simmering the flame is kept at a constant height after the setting is determined so that the water in the material being cooked will not boil away. This is difficult to accomplish as any changes in the gas supply pressure, varies the height of the burner flame. The control of the pressure of the gas supply to the range is made difficult by the small supply pressure available and by the A. G. A. minimum requirement that the loss in pressure in the regulator shall not be greater than 0.3 inch water at fully open flow.

Furthermore, a pressure regulator for this purpose must be relatively inexpensive to meet the requirements of the trade.

Accordingly, it is an object of this invention to produce a regulator which is relatively inexpensive to manufacture and which has a low pressure loss.

A further object is the provision of a regulator having a high capacity and which maintains a substantially constant outlet pressure over a considerable variation of inlet pressure.

Another object is the provision of an efficient regulator for maintaining a constant outlet pressure substantially independent of variations in inlet presure and having a diaphragm directly operating a valve without intermediate levers or linkages in which the use of a stuffing box or other sealing means is avoided.

According to the present invention, the valve body of the regulator is manufactured from iron by casting or molding the metal in steel molds, and the inlet, outlet, valve passage, valve seat and other passages through the body are then cut out by suitable tools. This results in the production of a valve body that is nonporous, and eliminates the loss due to the large number of castings rejected for porosity when the iron is cast in sand molds, and consequently reduces the cost of manufacture.

Further, the regulator of the present invention provides a regulator diaphragm in a regulator chamber and a valve stem passing through the valve casing into the regulator chamber, there being a clearance provided between the stem and casing to provide a substantially frictionless guide for the valve stem, and an exhaust passageway is provided in the outlet of the regulator substantially transverse to the direction of flow of the gas and connected to the regulator diaphragm so that gas flowing past said exhaust passageway has an aspirating effect and exhausts the gas which enters the regulator chamber through the clearance space, the area of the clearance space between the stem and casing being not substantially greater than one third the area of the exhaust passage, and preferably being considerably less. When one valve is used the valve of the regulator preferably is on the inlet side and is unbalanced so that the inlet pressure urges it into closed position. The outlet passage of the regulator is made large enough so that the pressure drop through the regulator is not excessive.

The invention will be explained in connection with the accompanying drawing wherein:

Figure 1 is a cross sectional view showing a preferred embodiment of the invention;

Figure 2 is a cross sectional view showing a modification,

Figure 3 is a graph showing the effect of variations in inlet pressure on the outlet pressure of the regulator constructed according to the present invention, and Figure 4 is a fragmentary section of a modification.

Referring to the drawing, the body 1 may be cast in a single piece with a depression 2 and a flange 3 originally formed thereon. The body is then machined by boring the valve stem guide passage 4, the expansion chamber 5, and the access hole 6, the later being threaded to receive a suitable closure cap 7. The outlet passage 8 is then bored transversely into the expansion chamber bore 5 and the outlet connection 9 is bored out and threaded. On the opposite side the inlet connection 11 is bored and then the connecting portion 12 is undercut to provide a communication between the bore 11 and the access bore 6, the connection 11 being finally threaded. The transverse exhaust passage 13 is then bored through the bottom wall of depression 2 into the flow passage 8.

The valve member comprises a stem 14 having a reduced portion 15 in the valve chamber providing a shoulder 16 and a valve member 17 is formed at one end of the stem and has a kerf in its end. The valve member 17 is inserted through access hole 6 with the stem 14 passing through the guide bore 4 and cooperates with a valve seat 18 formed in the access hole 6 on the inlet side of the regulator. The valve stem 14 is reduced and threaded at 19 at its opposite end and receives the washer 21 on the shoulder 22, a diaphragm pan 23 being placed on the washer and the diaphragm 24 being interposed between the pan 23 and pan 25. A nut 26 holds the diaphragm pans and diaphragm in assembled position on the stem, the outer periphery of the diaphragm being clamped between the cover 29 and flange 3 by suitable bolts 32. Thus, the depression 2 provides a control chamber closed on one side by the diaphragm 24, and communicating with the valve outlet by guide bore 4 and exhaust tube 13. The cover provides a threaded tube 34 in which is located a compression spring 35, one end of which abuts the diaphragm assembly and the other end abuts the threaded plug 36 in the bore whereby the compression of the spring can be adjusted. The threaded cap 37 closes the end of tube 34 in sealing relation, and the chamber 38 above the diaphragm is vented to atmosphere through a vent 38.

The principle of operation of the regulator now will be described. The differential pressure between the inlet side of valve 17 and the outlet side of this valve acts against the valve tending to close the same. Consequently when the inlet pressure varies at a given flow the higher the inlet pressure becomes the lower will be the pressure required in chamber 2 to balance the diaphragm, and if the same pressure existed in chamber 2 as in the outlet 8 it would be apparent that for a given flow the outlet pressure would rapidly decrease with increase in inlet pressure. This effect of inlet pressure differential across the valve 17 is especially pronounced at low flows, but as the flow through the regulator increases the inlet differential pressure across valve 17 decreases substantially proportional to the rate of flow, so that the differential inlet pressure effect across the valve is not so prominent at higher rates of flow. In the present regulator by maintaining the pressure in chamber 2 lower than the pressure in outlet 8 by an amount depending substantially on the rate of flow through the regulator, the effect of the differential inlet pressure across valve 17 is substantially neutralized, and the outlet pressure of the regulator becomes substantially independent of variations in inlet pressure.

In the regulator of the present invention the clearance between the stem 14 and the hole 4 is made large enough so that the valve has a free bearing in this bore, so that the friction therein does not have any effect on the sensitivity of the regulator, and the pressure in control chamber 2 is maintained lower than the pressure in outlet 8 by an amount dependent on the rate of flow by reason of the fluid flowing past the opening 13 exhausting the fluid from the chamber 2. However, because of the clearance between the stem 14 and bore 4, gas passing through the expansion chamber 5 enters this clearance into the control chamber 2 and a low flow substantially neutralizes the aspirating effect of flow past the exhaust passage 13. Consequently, at low flows the outlet pressure responds inversely to variations of inlet pressure. The aspirating effect produced by the flow of gas through the opening 13 is made great enough to substantially neutralize any impinging effect of gas entering chamber 2 through clearance 4 by having the passage 13 at least three times as large as the clearance space, and preferably even larger. Thus the fluid that enters the chamber 2 through the clearance 4 passes out the transverse passage 13 into the outlet 8, and the aspirating effect is great enough to practically overcome the impingement effect. The shoulder 16 assists in deflecting the fluid stream flowing along the valve stem to reduce the impinging effect of the fluid against the diaphragm, and the reduced portion of the stem in chamber 5 increases the volumetric capacity of the valve chamber and thus reduces the pressure loss through the regulator. The pressure in the outlet of the regulator thus is maintained substantially constant through a wide range of inlet pressure variations.

The graph illustrated in Figure 3 shows the improved results obtained by the regulator of the present invention. Curve A shows the outlet pressure of the regulator for flows from zero to 90 cu. ft. per hour, with an inlet pressure of 3.5" of water, and in which the clearance 4 is provided but the exhaust passage 13 is closed. Curve B shows the outlet pressure of the same regulator for an inlet pressure of 10.5" of water. It will be observed that under such conditions for a given flow the effect of variations in inlet pressure is very appreciable. Thus at a flow of 20 cu. ft. per hour, a rise in inlet pressure of from 3.5 in. to 10.5 in. will produce a drop in the outlet pressure to about 1.35 in. At a flow of 30 cu. ft. per hour the same difference in inlet pressure will produce a drop to about 0.5 in. in the outlet pressure. Above a flow of 30 cu. ft. per hour the variations in inlet pressure produces an even greater drop in the outlet pressure.

The curve C in Figure 3 shows the outlet pressure of the regulator built in accordance with the invention for flows from zero to 180 cu. ft. per hour with an inlet pressure of 3.5 in. of water, the passage 13 being open in this case. Curve D shows a similar outlet pressure curve where the inlet pressure is 10.5 in. of water. It will be seen that at a flow of about 5 cu. ft. per hour at an inlet pressure of 3.5 in. of water an outlet pressure of approximately 2.85 in. of water will be provided. If the pressure rises as high as 10.5 in. at this flow it will produce an outlet pressure of about 2.7 in., or a difference of only about 0.15 in., and from about 80 cu. ft. per hour to approximately 120 cu. ft. per hour the effect of variations in inlet pressure becomes even less until at 120 cu. ft. per hour where the curves intersect the effect becomes practically nil. After this point there is a slight divergence of the curves again, but throughout the whole range the outlet pressures are only slightly affected by variations in inlet pressure.

In the modification here shown as preferably constructed the ratio of exhaust passage 13 to the area of the clearance between the stem 14 and guide passage 4 is seven to one, and the ratio of effective diaphragm area to valve area on the high pressure side is about twenty-five to one. The difference in diameters between the passage 4 and the stem 14 may be on the order of from three to eight thousandths of an inch depending on the size of the regulator. The selected ratio is influenced to some extent by the projection of the shoulder 16 which acts to deflect the gas stream issuing through the valve orifice and to a certain extent prevents impingement of the gas stream against the diaphragm 24. The flow passage 8 may be formed in the Venturi tube principle if desired, with the exhaust passage 13 connected to the throat of the Venturi tube to further increase the aspirating effect.

In the modification shown in Figure 2 the tube 34 is replaced by a vent tube 40, and the spring is replaced by a suitable weight 41 which is secured to the valve stem in place of the diaphragm pan 25. In this modification the effect of elongation of the spring upon opening of the valve is eliminated and the outlet pressure flow curves at 3.5 in. and 10.5 in. of water inlet pressure will intersect at a slightly higher flow than in the case of the spring type regulator. This regulator therefore is somewhat less responsive to variations in the inlet pressure than the spring loaded type.

In the modification shown in Figure 4, the valve body 45 is formed as a casting with some of the openings cored therein. The dividing wall 46 between the inlet and outlet has a valve seat 47 machined therein and the guide bore 48 for the valve stem 14 also is machined in the casting. The inlet 49 and outlet 51 are originally cored in the casting. In this modification there is a lip 52 in advance of the exhaust passage 52 which increases somewhat the suction effect therethrough. This lip preferably is in the form of a sector, the lower end being a chord of the outlet circle.

The invention may be embodied in other specific forms without departure from the spirit or essential characteristics of the present invention. The specific form described herein therefore is to be considered in all respects as illustrative and not restrictive of the invention.

What is claimed and desired to be secured by United States Letters Patent is:—

A fluid pressure regulator comprising a body having a depression surrounded by a flange formed on one side thereof, aligned inlet and outlet connections formed therein and separated by a dividing wall having a horizontal portion, a valve seat in said dividing wall, a valve stem bore communicating with the outlet and said depression and in axial alignment with the valve seat, an access hole in substantially concentric alignment with the valve seat and communicating with the inlet bore, a plug closing said access hole, a diaphragm cover secured to said flange, a diaphragm clamped between said cover and body providing a control chamber with the body, a valve stem secured to said diaphragm and extending through said stem bore with a radial clearance on the order of about three to eight thousandths of an inch and having a valve member thereon seating on one side of the dividing wall, a transverse exhaust bore connecting the regulator outlet and control chamber having a minimum area from three to seven times the area of said clearance, and a projecting lip in said outlet in advance of the exhaust bore to increase the suction effect of said bore.

FRITZ NIESEMANN.